United States Patent
Sawada et al.

(10) Patent No.: US 7,187,642 B2
(45) Date of Patent: Mar. 6, 2007

(54) OPTICAL INFORMATION RECORDING MEDIUM WITH ROM AREA HAVING PRE-PITS

(75) Inventors: Yasuo Sawada, Machida (JP); Yasuhide Fujiwara, Atsugi (JP)

(73) Assignee: Ricoh Company, Ltd., Tokoyo (JP)

( * ) Notice: Subject to any disclaimer, the term of this patent is extended or adjusted under 35 U.S.C. 154(b) by 0 days.

(21) Appl. No.: 11/197,876

(22) Filed: Aug. 5, 2005

(65) Prior Publication Data

US 2006/0002284 A1 Jan. 5, 2006

Related U.S. Application Data

(63) Continuation of application No. 10/005,967, filed on Nov. 12, 2001, now abandoned.

(30) Foreign Application Priority Data

Nov. 15, 2000 (JP) .............................. 2000-348702

(51) Int. Cl.
*G11B 7/24* (2006.01)
(52) U.S. Cl. .................. 369/275.3; 369/275.4
(58) Field of Classification Search ............. 369/275.3, 369/275.4, 275.1, 47.1, 53.1, 44.13, 44.11, 369/44.26, 44.23, 44.28, 53.2, 59.1, 277, 369/278

See application file for complete search history.

(56) References Cited

U.S. PATENT DOCUMENTS

| 5,943,313 | A | 8/1999 | Ando et al. |
| 6,438,098 | B1 | 8/2002 | Nakajima et al. |
| 6,487,147 | B2 | 11/2002 | Miyagawa et al. |
| 6,580,678 | B2 | 6/2003 | Kondo et al. |
| 6,678,236 | B1 | 1/2004 | Ueki |

FOREIGN PATENT DOCUMENTS

| JP | 5-006578 | 1/1993 |
| JP | 5-012680 | 1/1993 |
| JP | 5-036087 | 2/1993 |
| JP | 6-131701 | 5/1994 |
| JP | 8-007339 | 1/1996 |

*Primary Examiner*—Ali Neyzari
(74) *Attorney, Agent, or Firm*—Cooper & Dunham LLP

(57) ABSTRACT

An optical information recording medium having a ROM area in which pre-pits are arranged in a line in advance, wherein a groove having a depth smaller than a depth of the pre-pits is formed between the pre-pits, and the groove has a width at junction parts smaller than a width of a part of the groove other than the junction parts. Preferably the following relationships are satisfied: ½ Wg≦Wpg<Wg; and Wpg<Wp, where Wp, Wpg and Wg represent a width of the pre-pit, the width of the groove at the junction parts, and the width of the other part of the groove other than the junction parts, respectively.

16 Claims, 11 Drawing Sheets

OPTICAL INFORMATION RECORDING MEDIUM WITH ROM AREA HAVING PRE-PITS

CROSS REFERENCE TO RELATED APPLICATION

This application is a continuation of applicants' U.S. patent application Ser. No. 10/005,967, filed Nov. 12, 2001 now abandoned.

BACKGROUND OF THE INVENTION

1. Field of the Invention

The present invention relates to an optical information recording medium, more specifically, to an optical information recording medium such as a CD-R (compact disk recordable) medium, and a CD-RW (compact disk rewritable) medium, and particularly, to an optical information recording medium having a ROM area in which pre-pits are arranged in advance and a recordable area in which a guiding groove is arranged.

2. Discussion of the Background

A recordable compact disk (CD) called "CD-R" is prescribed in the Orange Book, an industry standard. An ordinary CD-R has a pre-groove arranged on its entire surface. The pre-groove wobbles, and by changes of the wobbling period, time information called "ATIP" (absolute time in pre-groove) is recorded. A CD-R is partitioned, from the central part outward, into the following areas: a PCA (power calibration area) in which the light level is set, a PMA (program memory area) in which recording location information is recorded, an LIA (lead-in area) in which contents information (table of contents) is recorded, and an information area (program area) in which data is recorded. Information is recorded by recording pits along the pre-groove using a CD writer.

A CD-R can be written-once by recording the recorded location information (ATIP time) into PMA after recording information. Thus, after writing once into CD-R, pits are formed in a part of the information area and a part of PMA. Also, there is a CD-R, on which pre-pits are partly recorded in advance, called a "hybrid disk". Part of the information area and PMA are formed by pre-pits. The pre-pits wobble in the same manner as a pre-groove.

FIGS. 8A–8D and 9A–9E illustrate an example method for creating a hybrid CD-R. In a resist-forming process as shown in FIG. 8A, a disc-shape glass plate 10 is prepared, with two layers of photo resist 11 and 13 formed sandwiching an interlayer 12. In an exposure process as shown in FIG. 8B, a laser beam L is irradiated onto the photo resist films 11 and 13 by an exposure apparatus while rotating the films, thereby forming a spiral-shaped latent image i on the photo resist films 11 and 13. Then, in a development process as shown in FIG. 8C, the latent image portion is dissolved. At this time, a deep pre-pit 1 and a sallow groove (groove between the pre-pits) 2, which are created distinctively by controlling the light level of the exposure during the above-mentioned exposure time, are obtained. In this regard, in FIG. 8C, $I_1$, $I_2$, and I denote the recording area, the ROM area, and the information area, respectively.

Then, in an electroforming process as shown in FIG. 8D, an electroforming layer which will be used as a stamper 14 is formed, in a glass-detachment process as shown in FIG. 9A, a glass plate is detached, and then in a resist-removing/stamper-forming processes as shown in FIG. 9B, the remaining photo resist 11 and 13 are removed to form a stamper 14 which includes a deep pit-formed part 1' having a depth from the top surface of the photo resist 13 to the bottom of the lower photo resist 11 and a shallow groove formed part 2' having a depth from the top surface of the photo resist 13 to the top surface of the lower photo resist 11.

In a formation process as shown in FIG. 9C, formation is performed using the obtained stamper 14, and a large number of formation plates 15 are replicated. Then, in the process of applying recording agent as shown in FIG. 9D, recording agent 16 is applied to the entire surface of the formation plate 15, and furthermore, a reflection layer 17 and a protection layer 18 are formed during the formation process of the reflection layer/protection layer as shown in FIG. 9E. Through the above processes, a hybrid CD-R on which information is recorded partly in advance by an exposure apparatus is created.

Next, a conventional example will be specifically described. Conventionally, there has been a problem in that a tracking error signal (push-pull signal) of a ROM (Read Only Memory) area, which is formed by pre-pits, is smaller than that of a recodable area which is formed by a pre-groove. In order to improve this, for example, in Japanese Laid-Open Patent Publication No. 5-6578, the tracking error in the pre-pit area has been improved by forming a groove between the pits which is wider and shallower than a pre-groove between address pits of an information recording medium.

Also, in Japanese Laid-Open Patent Publication No. 5-12680, a pre-groove between the pits, which has the same depth and width as a pre-groove between the pre-pits of the above-described hybrid disk, is formed, thereby eliminating fluctuations of reflection rate in the pre-pit area and pre-groove area. In addition, in Japanese Laid-Open Patent Publication No. 6-131701, a groove between pits is formed between pre-pits such that the tracking error signal becomes the same in the recordable/reproducible area in which pre-groove is formed as in the reproduction-only area in which pre-pits are formed in a partial ROM where both the recordable/reproducible area and the reproduction-only area exist.

In addition, in Japanese Laid-Open Patent Publication No. 8-7339, in a partial ROM, in order to improve the tracking error signal and CTS (cross track signal) in the reproduction-only area in which pre-pits are formed, a groove between the pits which is narrower than the pre-pits and shallower than $\lambda/8n$ is formed between the pre-pits. Also, as described in Japanese Laid-Open Patent Publication No. 5-36087, there arises a problem that when a pre-pit has wobbling, the WCN (wobble C/N ratio) becomes lower as compared to that with a pre-groove, and jitter increases as the wobbling amount increases. As a means to solve this, a groove is formed between the above-described pre-pits.

FIGS. 10A–10B and 11A–11B illustrate a groove between the pits which connects pre-pits as described above. FIG. 10B shows schematically a sectional view (a cross-sectional view of CD-R in a circumferencial direction) of FIG. 10A. Also, FIG. 11A shows schematically a partially-enlarged plan view of a conventional pit structure having a groove between pits. FIG. 11B shows schematically a sectional view (a cross-sectional view of a CD-R in a circumferencial direction) of FIG. 11A. Also, FIG. 12 is a partial perspective view of a ROM area in which pre-pits 1 and grooves between the pits 2 are formed as shown in FIGS. 11A and 11B.

As shown in FIGS. 11A and 11B, there has been a problem in that when connecting one pre-pit 1 with another by a groove 2 between pits, as a result of the influence of the groove between the pits, the pre-pit 1 is extended in the direction of the track. This extension is not uniform, and the angle of inclination becomes small in cross-section of pre-pits 1 in the direction of track, thereby deteriorating the jitter.

Also, as shown in FIGS. 13A and 13B, when pre-pits wobble, the WCN (Wobble C/N ratio) is lower than that with a pre-groove, thus as the amount of wobbling increases, the jitter increases. To solve this, the above-described groove between the pre-pits is an effective method.

SUMMARY OF THE INVENTION

Accordingly, the present invention is made in view of the foregoing, and an object is to provide an optical information recording medium having a ROM area and a recordable area in which a tracking error signal and WCN of the pit parts are improved without deteriorating the jitter of the pits.

According to a first aspect of the present invention, there is provided an optical information recording medium having a ROM area in which pre-pits are arranged in advance, wherein a groove having a depth smaller than that of the pre-pits is formed between the pre-pits, and the groove has a width at junction parts smaller than that of the area of the groove other than the junction parts.

In the first aspect of the present invention, given that the widths of the pre-pit, the junction parts, and the other part of the groove are Wp, Wpg, and Wg, respectively, the following relationships are satisfied:

$$\tfrac{1}{2}\, Wg \leq Wpg < Wg \text{ and } Wpg < Wp.$$

According to a second aspect of the present invention, there is provided an optical information recording medium having a ROM area in which pre-pits are arranged in a line in advance, wherein a groove having a depth smaller than that of the pre-pits is formed between the pre-pits, and the groove has a depth at junction parts smaller than that of the other areas of the groove.

In the second aspect of the present invention, given that the depths of the junction parts of the groove, and the other part of the groove are Dpg, and Dg, respectively, Dpg preferably satisfies the following relationship is preferably satisfied:

$$\tfrac{1}{2}\, Dg \leq Epg < Dg.$$

According to a third aspect of the present invention, there is provided an optical information recording medium including a substrate, a ROM area which is formed on the substrate and in which pre-pits are arranged in a line in advance and a recordable area which is formed on the substrate and in which a guiding groove is arranged, wherein the pre-pits and the guiding groove wobble in the radius direction of the substrate, and wherein a groove having a depth smaller than that of the pre-pits is formed between the pre-pits, and the groove has a wobbling amount greater than that of the pre-pits.

According to a fourth aspect of the present invention, there is provided an optical information recording medium having a ROM area in which pre-pits are arranged in a line in advance and a recordable area in which a guiding groove is arranged, wherein a pit having a depth not greater than the pre-pits is formed between the pre-pits.

In the fourth aspect of the present invention, the pit between two pre-pits is preferably connected to both of the pre-pits.

Also, in the fourth aspect of the present invention, the pit preferably has the same depth as the guiding groove.

In addition, in the fourth aspect of the present invention, the pit preferably has a width not greater than the guiding groove.

According to a fifth aspect of the present invention, there is provided an optical information recording medium including a substrate, a ROM area which is formed on the substrate and in which pre-pits are arranged in a line in advance and a recordable area which is formed on the substrate and in which a guiding groove is arranged, wherein the pre-pits and the guiding groove wobble in the radial direction of the substrate, and wherein a pit having a depth smaller than that of the pre-pits is formed between the pre-pits, and the pit has a wobbling amount greater than that of the pre-pits.

According to a sixth aspect of the present invention, there is provided an optical information recording medium including a substrate; a ROM area which is formed on the substrate and in which pre-pits ate arranged in a line in advance; a recordable RAM area which is formed on the substrate and in which a pre-groove is arranged; a recording layer which is located overlying the substrate; a reflection layer which is located overlying the recording layer; and a protection layer which is located overlying the reflection layer, wherein a groove is formed between the pre-pits along the line of the pre-pits, and a projection portion is formed in the height direction of the substrate at junction parts of the pre-pits and the groove.

In the sixth aspect of the present invention, the recording layer is preferably a dye layer.

Also, in the sixth aspect of the present invention, given that the height from the bottom of the pre-pits to the top of the projection part is Hp, and the height from the bottom of the groove to the top of the projection part is Hg, the following relationship is preferably satisfied:

$$Hg/Hp > 0.08.$$

Moreover, in the sixth aspect of the present invention, in addition to the above-mentioned condition, given that the track-direction length of the bottom of the pre-pits of the 3T pit is Lbp, and the track-direction length of the bottom of the groove between the pre-pits of the 3T land is Lbg, the following relationship is preferably satisfied:

$$Lbg/Lbp > 0.75.$$

Furthermore, in the sixth aspect of the present invention, the projection part is preferably steep-edged.

As is apparent from the above description, according to the first, second, and fourth aspects of the present invention, by connecting between pre-pits using a groove or a pit, the tracking error signal, WCN, and so on, can be improved, and deterioration of jitter can be prevented.

According to the first, second and fourth aspects of the present invention, by specifying disposition measurements of the pre-pit and the groove, deterioration of WCN caused by widening of the clearance between the pre-pit and the groove between pits can be prevented.

According to the third, and fifth aspects of the present invention, the WCN can be improved without deteriorating jitter.

According to the fourth aspect of the present invention, by making a pit between the pre-pits, which has the same width and depth as those of the guiding groove, the tracking error signal can be ensured same as that obtained by the guide groove.

According to the sixth aspect of the present invention, a projection portion is formed in the height direction of the substrate at junction parts of the pre-pits and the groove, resulting in prevention of worthless extension of a pre-pit in the direction of track due to formation of the groove between pits, thereby decreasing the jitter in the ROM part.

Also, according to the sixth aspect of the present invention, in the structure of a CD-R medium, a projection portion is formed in the height direction of the substrate at junction parts of the pre-pits and the groove, resulting in prevention of worthless extension of a pre-pit in the direction of track due to formation of the groove between pits, thereby decreasing the jitter in the ROM part.

Moreover, according to the sixth aspect of the present invention, the relationship between the height from the bottom of the pre-pits to the top of the projection part, Hp, and the height from the bottom of the groove to the top of the projection part, Hg, are specified, thus decreasing the jitter in the ROM part can be performed effectively.

Furthermore, according to the sixth aspect of the present invention, the relationship between the track-direction length of the bottom of the pre-pits of the 3T pit, Lbp, and the track-direction length of the bottom of the groove of the 3T land, Lbg, is specified, decrease of WCN in the ROM part can be avoided.

These and other objects, features and advantages of the present invention will become apparent upon consideration of the following description of the preferred embodiments of the present invention taken in conjunction with the accompanying drawings.

DETAILED DESCRIPTION OF THE INVENTION

Embodiments of the present invention will now be described in detail with reference to the accompanying examples.

The structure of an optical information recording medium according to a first embodiment of the present invention includes a ROM area in which pre-pits are arranged in advance and a recordable area in which a guiding groove is arranged. In the structure, a groove (groove between pits) is formed between two pre-pits which are created on a substrate, and a junction part between the pre-pit and the groove between pits is narrower and shallower than the groove between pits, thus the groove between pits i and pre-pits is separated, thereby eliminating any effect on the pre-pits from the groove between pits.

The structure of an optical information recording medium according to a second embodiment of the present invention includes a ROM area in which pre-pits are arranged in advance and a recordable area in which a guiding groove is arranged. In the structure, a shallow pit (pit between pits) is formed in series between two pre-pits which are created on a substrate.

Having generally described this invention, a further understanding can be obtained by reference to certain specific examples which are provided herein for purposes of illustration only and are not intended to be limiting.

EXAMPLE 1

Figure 1A:
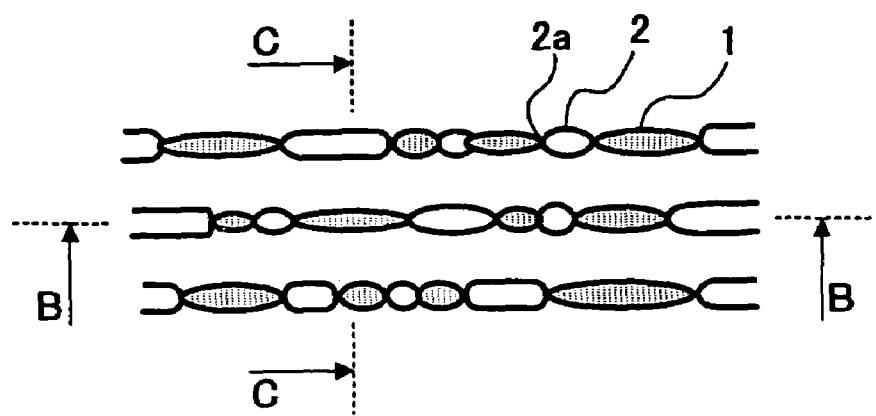
FIGS. 1A–1C illustrate the structure of an optical information recording medium according to an embodiment of the present invention.
Figure 1B:
Figure 1C:

FIG. 1 illustrates the structure of an optical information recording medium according to an embodiment of the present invention. FIG. 1A is a partially enlarged plan view illustrating the structure of pits on the surface of a CD-R. FIG. 1B is a cross-sectional view when the CD-R is cut along line B (i.e., in a circumferential direction of the CD-R) as shown in FIG. 1A. FIG. 1C is a cross-sectional view when the CD-R is cut along line C (i.e., in a radial direction of the CD-R) as shown in FIG. 1A. In a ROM area, a pre-pit 1 which has a depth of 3200 Å is disposed, and between the pre-pits, a groove between pits 2 which has a depth of 1800 Å, and has a constricted shape at the junction part 2a with the pre-pit 1 is formed.

In the present example, a substrate which includes a pre-pit 1 having a depth of 3200 Å and a guiding groove (not shown in the figure) having a depth of 1800 Å was created, and a hybrid CD-R medium was created. In the groove between pits 2, the width of the junction part 2a between pre-pit 1 was smaller (the width of a main part×½≦the width of the junction part) than the other parts (referred to a main part), and the depth was smaller (the depth of the main part×½≦the depth of the junction part) than the other parts, thus the pre-pit 1 and the main part of the groove between pits 2 were separated. As shown in Example 1 in Table 1, with the present arrangement, the jitter was improved by about 10 nsec compared to that with Comparative Example 2 according to the conventional technique described later. Also, when the pits wobbled by 70 nm, the WCN could be maintained at almost the same level as that in Comparative Example 2 described later.

EXAMPLE 2

The present example has the structure as shown in FIG. 1 in the same manner as Example 1, however, the width of the junction part 2a of the groove between pits 2 and pre-pit 1 was smaller than one second of the width of a main part, and the depth of the junction part 2a of the groove 2 between pits and pre-pit 1 was smaller than one second of the depth of a main part, thus the pre-pit 1 and the main part of the groove 2 between pits were separated widely. With the arrangement of the present example, the WCN decreased as shown in Table 1.

EXAMPLE 3

The present example has the structure as shown in FIG. 1 in the same manner as Examples 1 and 2, however, the wobbling amount of the pre-pit 1 was kept as it was, and the wobbling amount of the groove between pits was increased to 110 nm. With the arrangement of the present example, the jitter was the same, but the WCN could be increased by 2 dB.

EXAMPLE 4

Figure 2A:
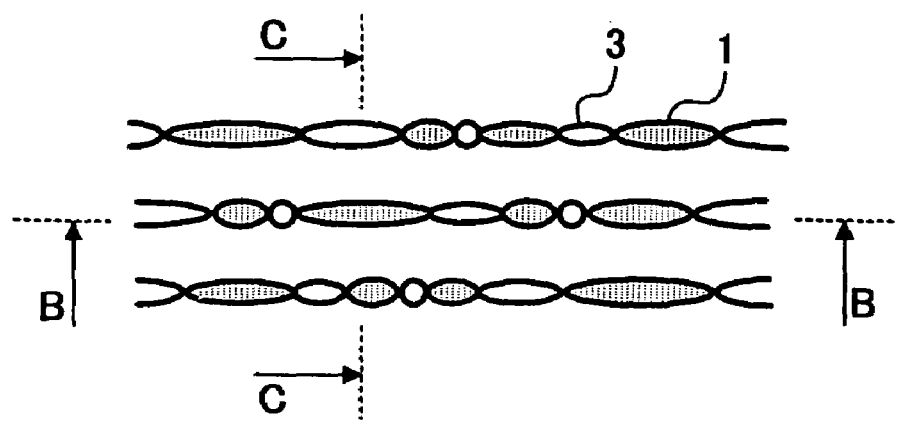
FIGS. 2A–2C illustrate the structure of an optical information recording medium according to another embodiment of the present invention.
Figure 2B:
Figure 2C:
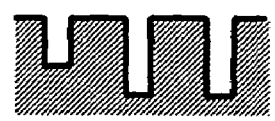

FIGS. 2A–2C illustrate the structure of an optical information recording medium according to another embodiment of the present invention.

FIG. 2A is a partially enlarged plan view illustrating the structure of pits on the surface of a CD-R. FIG. 2B is a cross-sectional view when the CD-R is cut along line B (i.e., in a circumferential direction of the CD-R) as shown in FIG. 2A. FIG. 2C is a cross-sectional view when the CD-R is cut along line C (i.e., in a radial direction of the CD-R) as shown in FIG. 2A. In a ROM area of the present example, a pre-pit 1 having a depth of 3200 Å is arranged, and between one pre-pit 1 and the other pre-pit 1, a pit 3 between pits having a depth of 1800 Å is formed to connect both of the pre-pits together. A substrate which includes the pre-pit structure described above, and a guiding groove having a depth of 1800 Å (not shown in the figure) was created, and also a hybrid CD-R was created. As shown in Table 1, the result was satisfactory as to jitter, the WCN, and push-pull. In addition, when a pit 3 between pits and pre-pit 1 were apart from each other, the WCN decreased, and distortion of the pre-pit signal occurred.

EXAMPLE 5

The present example has the structure as shown in FIGS. 2A–2C in the same manner as Example 4, however, the wobbling amount of the pre-pit 1 was kept as it was, and the wobbling amount of the pit 3 between pits was increased to 110 nm. With the arrangement of the present example, the jitter was the same, but the WCN could be increased by 2 dB.

COMPARATIVE EXAMPLE 1

Figure 3A:
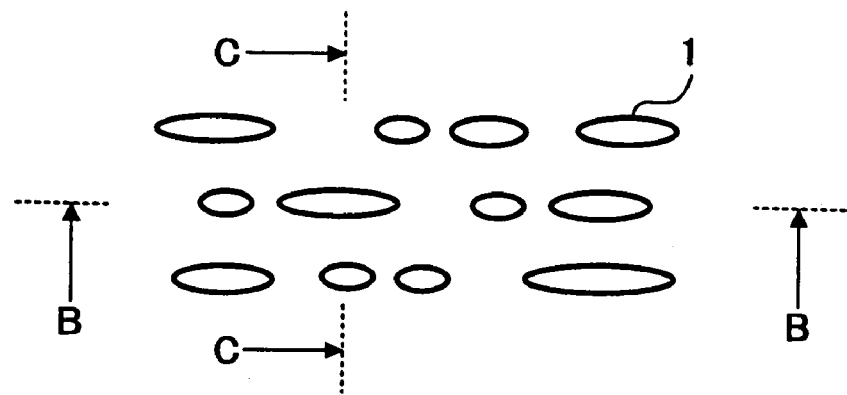
FIGS. 3A–3C illustrate a comparative example of an optical information recording medium according to the conventional structure.
Figure 3B:
Figure 3C:
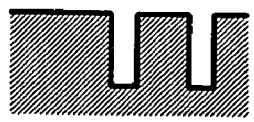

FIGS. 3A–3C illustrate a comparative example of an optical information recording medium according to the conventional structure. FIG. 3A shows schematically a partially enlarged plan view of the structure of pits on the surface of a CD-R. FIG. 3B shows schematically a cross-sectional view taken on line B in a circumferential direction of FIG. 3A. FIG. 3C shows schematically a cross-sectional view taken on line C in a radial direction of FIG. 3A. With the conventional technical means, a substrate which includes a pre-pit 1 having a depth of 3200 Å and a guiding groove having a depth of 1800 Å was created, and phtalocyanine dye was applied, and then reflection film was attached, thus the hybrid CD-R medium was created. As shown in Table 1, the medium of the comparative example 1 had small jitter of 27 nsec, however, the push-pull signal was small, and the difference between the push-pull signal having a value from 0.13 to 0.18 in the recordable area was too large, thus an oscillation occurred in tracking. Also, when the pits wobbled by 70 nm, the WCN became 30 dB, which was far below the necessary WCN, 33 dB.

COMPARATIVE EXAMPLE 2

Figure 4A:
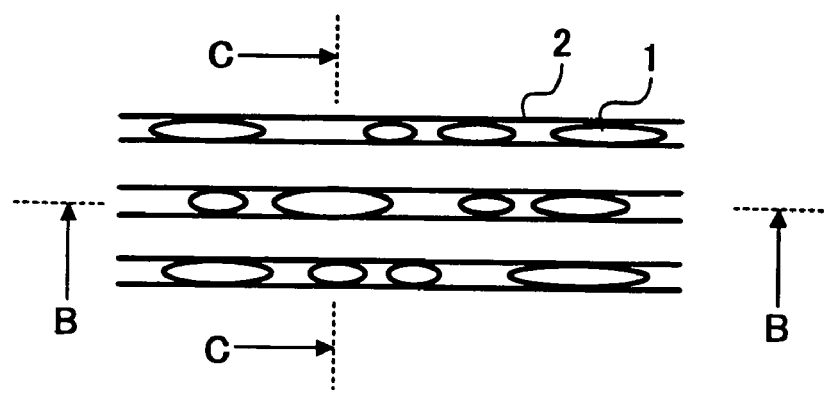
FIGS. 4A–4C illustrate another comparative example of an optical information recording medium according to the conventional structure.
Figure 4B:
Figure 4C:

FIGS. 4A–4C illustrate another comparative example of an optical information recording medium according to the conventional structure. FIG. 4A is a partially enlarged plan view illustrating the structure of pits on the surface of a CD-R. FIG. 4B is a cross-sectional view when the CD-R is cut along line B (i.e., in a circumferential direction of the CD-R) as shown in FIG. 4A. FIG. 4C is a cross-sectional view when the CD-R is cut along line C (i.e., in a radial direction of the CD-R) as shown in FIG. 4A. In the present comparative example, a substrate which includes a pre-pit 1 having a depth of 3200 Å, and a groove 2 between pits having a depth of 1800 Å and a shape as shown in the figure, and which is formed between the pre-pits 1, and a guiding groove having a depth of 1800 Å was created, and also the hybrid CD-R medium was created. As shown in Table 1, the push-pull signal of the medium of the comparative example was not so different from that in the recordable area, the jitter was 40 nsec or more, which was far greater than the specification (35 nsec) (the WCN was 38 dB).

Next, a third embodiment of the present invention and the specific examples will be described. The structure of an optical information recording medium according to a third embodiment of the present invention includes a groove between pre-pits which is formed between a pre-pit in the ROM area and the other pre-pits, and the pre-pit and the junction part of the groove between pre-pits are separated, and a projection portion is formed in the height direction of a junction part, thus the steepness of the shape of cross-section is increased, thereby improving the jitter in the pre-pit part.

The above-described projection portion can be formed by controlling the pulses for driving a laser beam when exposing a master. Specifically, by controlling a time period between a fall of a pit-irradiating pulse and a rise of a groove-between-pits-irradiating pulse (Tw), and a rise of a pit-irradiating pulse and a fall of a groove-between-pits-irradiating pulse (Tw'), the above-described junction part can be formed to be flat or with a projection portion. Usually when switching a pit and a groove between pits of 3T to 1T, the exposure is performed with the same Tw and at the same time, Tw=Tw'.

Figure 5:
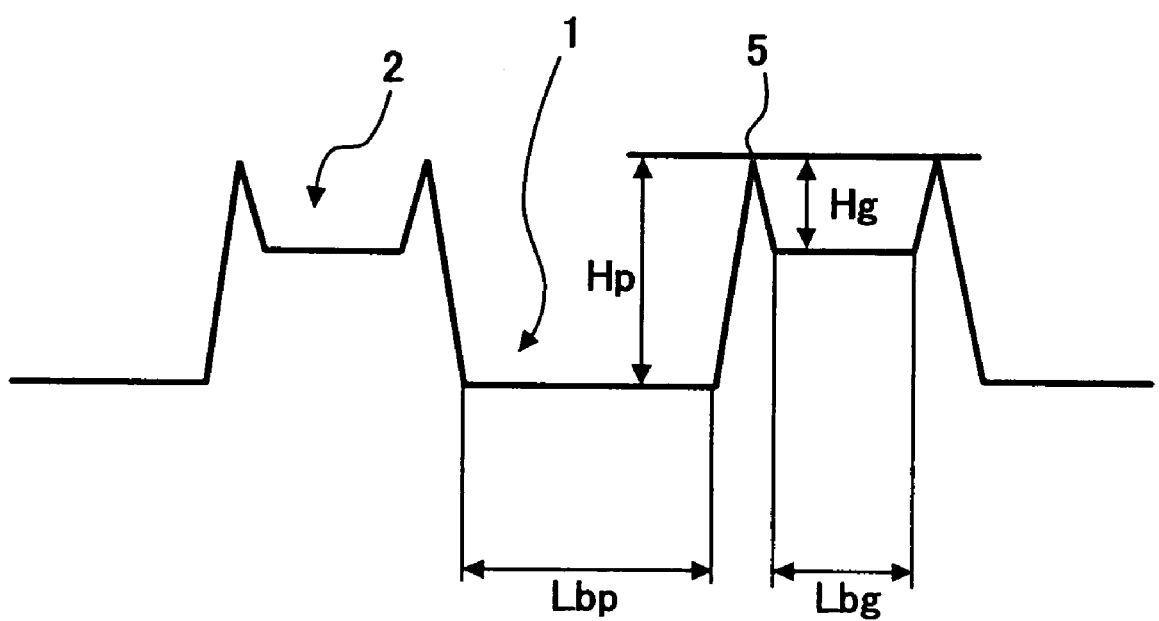
FIG. 5 illustrates schematically a cross-sectional shape taken in the direction of track of an optical information recording medium according to another embodiment of the present invention.

FIG. 5 illustrates schematically a cross-sectional shape taken in the direction of track of an optical information recording medium according to the third embodiment of the present invention. In the figure, 1 denotes a pre-pit, 2 denotes a groove between pits, 5 denotes a corniform projection portion, Hp denotes the height from the bottom of the pre-pit 1 to the top of the corniform projection portion 5, Hg denotes from the bottom of the groove of pits 2 to the top of the corniform projection portion 5, Lbp denotes the length of the bottom of the pre-pit 1 in the direction of track, and Lbg denotes the length of the bottom of the groove between pits 2 in the direction of track.

Figure 6:
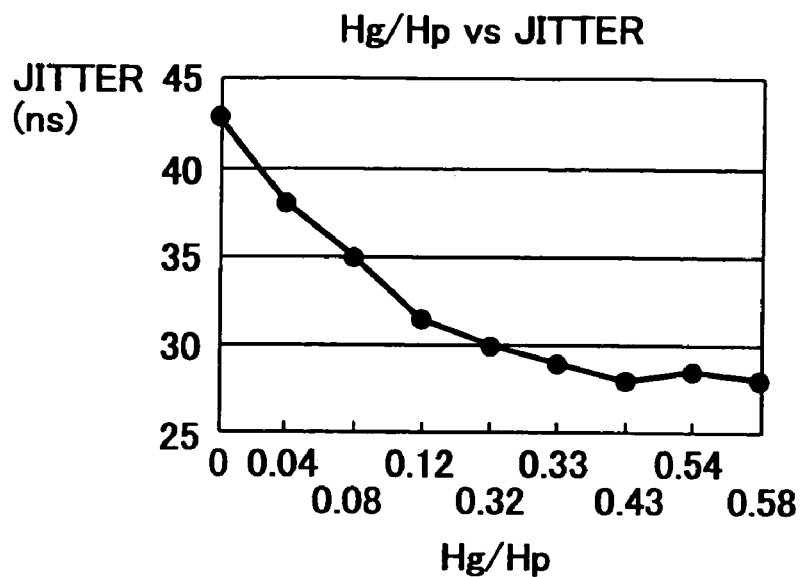
FIG. 6 is a graph showing the value of the jitter in response to Hg/Hp of the optical information recording medium created with changing Tw in the form of FIG. 6.

FIG. 6 is a graph showing the value of the jitter in response to Hg/Hp of the optical information recording medium using various substrates created with changing Tw. The greater the Hg/Hp is, that is, the larger (higher) corniform projection portion 5 is, the better is the jitter. In order to meet the standard of the Orange Book, 35 ns, it is necessary to satisfy: Hg/Hp>0.08.

Figure 7:
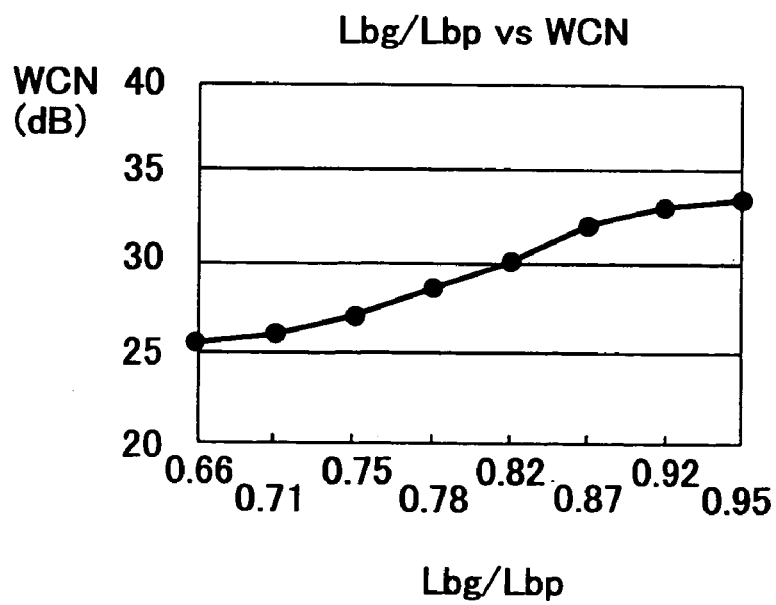
FIG. 7 is a graph showing the value of the jitter in response to Lbg/Lbp of the optical information recording medium created with changing Tw in the form of FIG. 6.
Figure 8A:
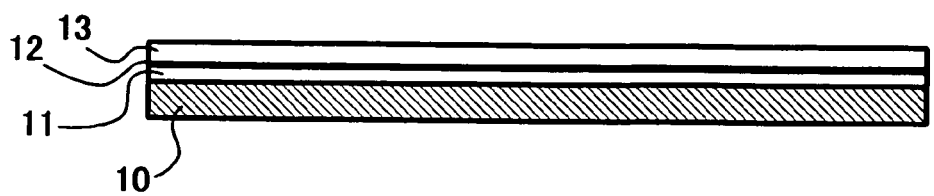
FIGS. 8A–8D show an example of a creating method of a hybrid CD-R following the process.
Figure 8B:
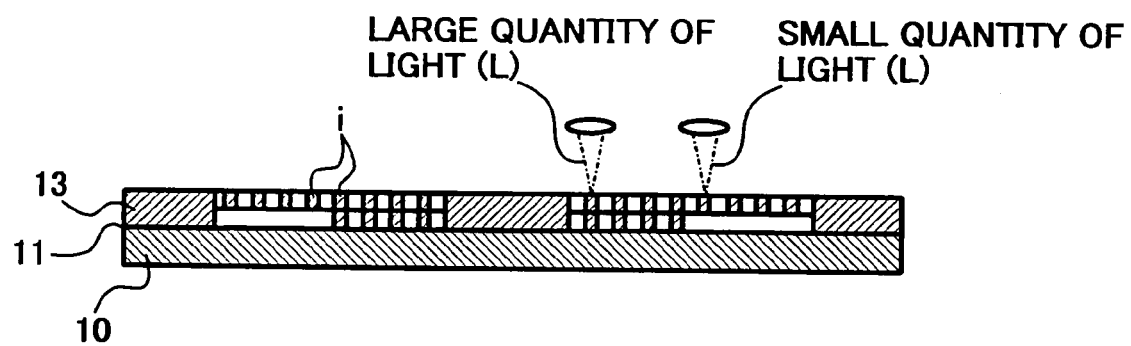
Figure 8C:
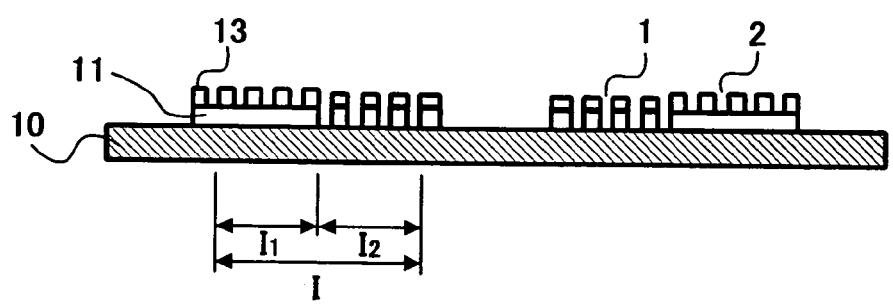
Figure 8D:
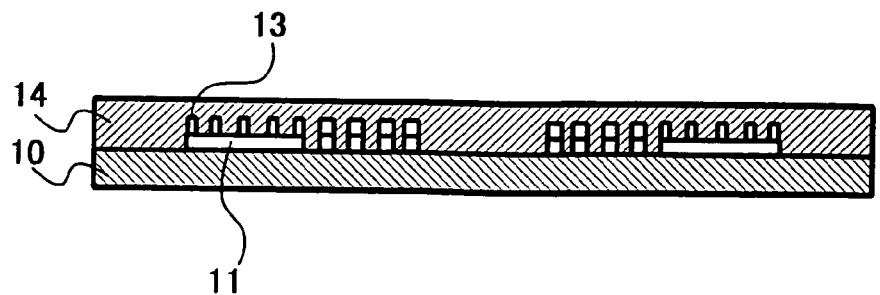
Figure 9A:
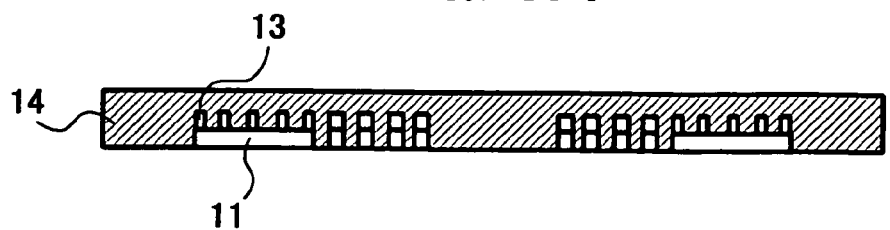
FIGS. 9A–9E show an example of a creating method of a hybrid CD-R following the subsequent process of FIG. 9.
Figure 9B:
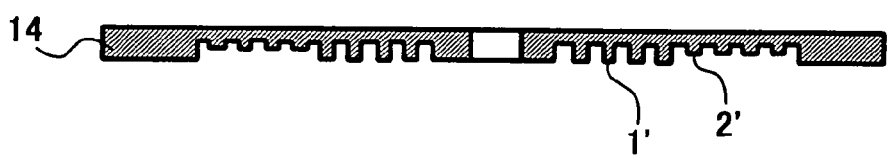
Figure 9C:
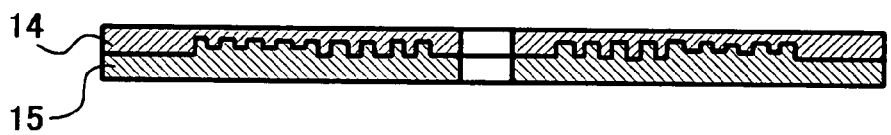
Figure 9D:
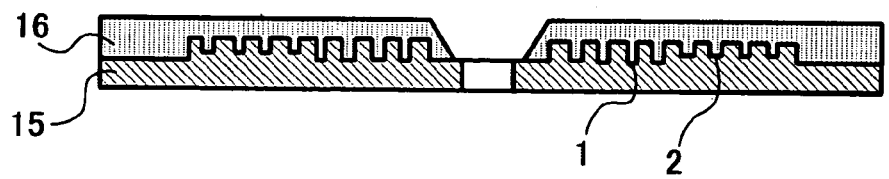
Figure 9E:
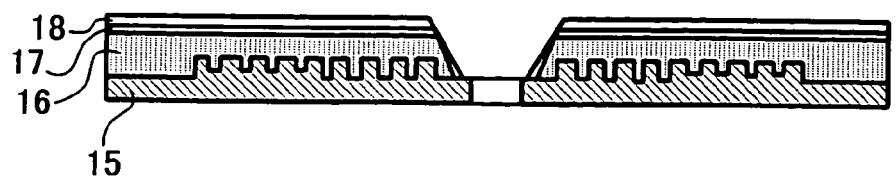
Figure 10A:
FIGS. 10A and 10B illustrate an example of the structure of pre-pits.
Figure 10B:
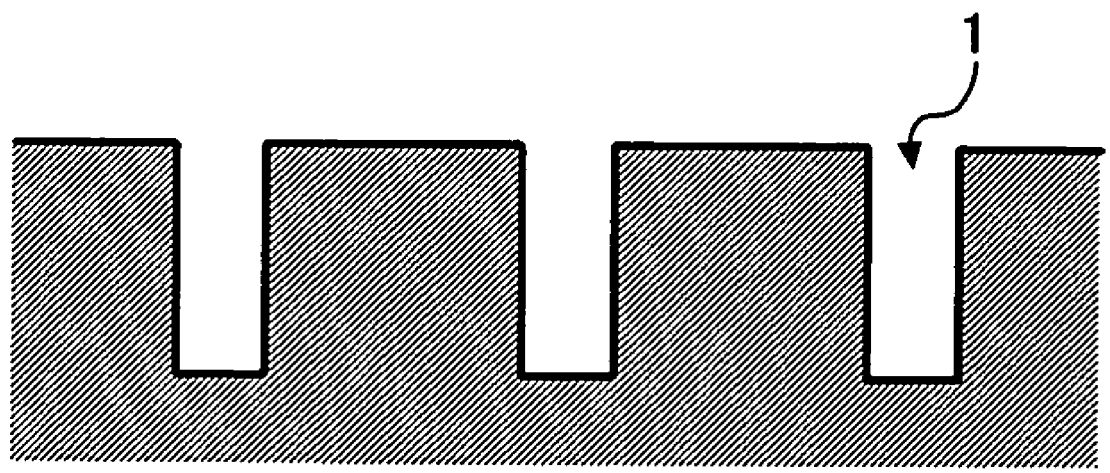
Figure 11A:
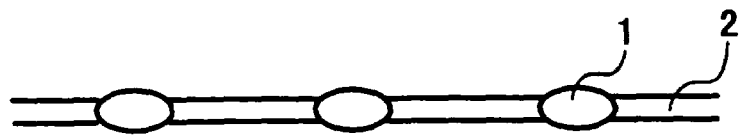
FIGS. 11A and 11B illustrate an example of the structure of a groove between pits which connects pre-pits.
Figure 11B:
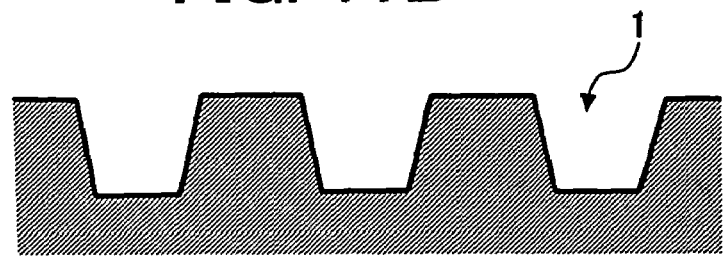
Figure 12:
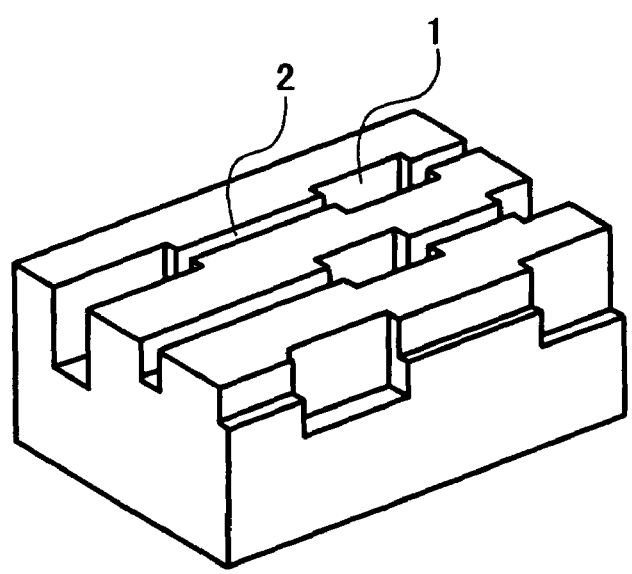
FIG. 12 is a partial perspective view showing the structure of a groove between pits which connects pre-pits.
Figure 13A:
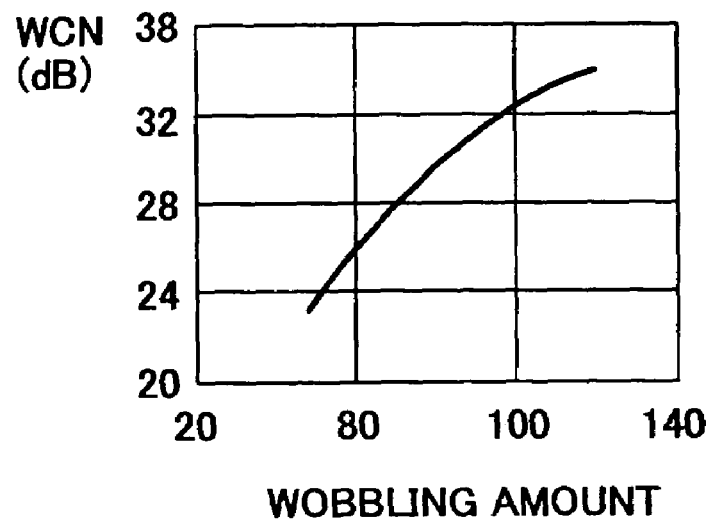
FIGS. 13A and 13B show the relationship a wobbling amount of a pre-pit and WCN (wobble C/N ratio) and the relationship of a wobbling amount and jitter.
Figure 13B:
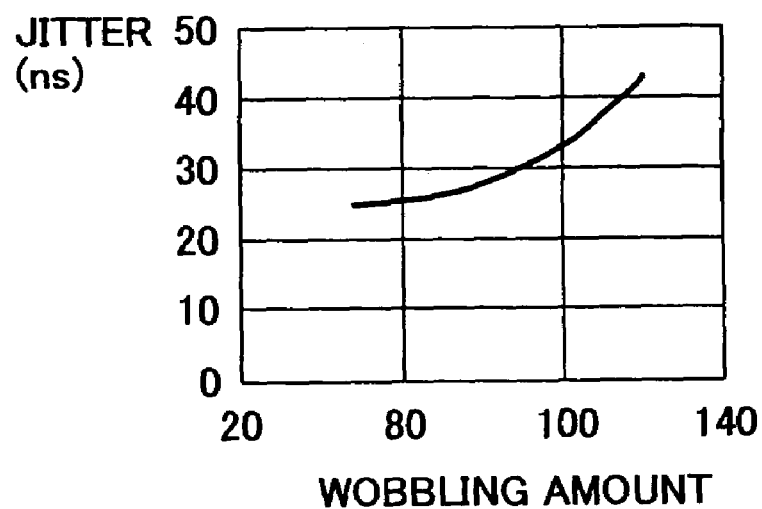

FIG. 7 is a graph showing the value of WCN in response to Lbg/Lbp of 3T pit and 3T land of the optical information recording medium using various substrates created with changing Tw. The larger Lbp is, the larger is WCN. In order to meet the standard of the Orange Book, 26 ns, it is necessary to satisfy: Lbg/Lbp>0.75. At this time, when switching exposure between the pits 3T to 11T and the groove between pits, the master is exposed on the condition that the same Tw and Tw=Tw', thus the WCN in FIG. 5 is nearly the same for each pit 3T to 11T and a groove between pits.

EXAMPLE 6

On the surface of a substrate, from the TOC (Table of Contents) part to an inner part of substrate with radius 35 mm, pre-pits having a depth of 3100 Å, a width of 0.6 μm, and a track pitch of 1.6 μm, and a groove between pits having a depth of 1700 Å and a width of 0.4 μm, and which connects the pre-pits were arranged. Furthermore, a guiding groove having a depth of 1700 Å, a width of 0.7 μm, and a track pitch of 1.6 μm was disposed outside of the above-described part.

When exposing a master, a time period between a fall of an irradiating pulse of a pre-pit in the ROM part and a rise of a groove-between-pits-irradiating pulse (Tw) was set to 150 ns, an exposure time of 3T pre-pits in the ROM part is set to 403 ns, an exposure time of 4T to 11T is set to N×231–290 ns, the wobble width of the pre-pit in the ROM part and the groove between pits was set to 70 nm (peak to peak). Then a light absorption layer which is made from phtalocyanine dye was disposed by spin coating embrocation using mixed solvent made of ethylcyclohexane. After applying light absorption layer, heat treatment was performed by 100° C. for 30 minutes, and then Ag was disposed with a thickness of about 1400 Å by sputtering to form a reflection layer. On the layer, ultraviolet curable resign was applied by a spinner, and then hardened by ultraviolet ray to form a protection layer of about 5 μm. Furthermore, ultraviolet curing ink was applied on the layer by screen printing to form an upper protection layer of about 10 μm. Through the above processes, the CD-R optical information recording medium was obtained.

When the ROM area of the above-described optical information recording medium was reproduced by a record-reproducing unit having a pickup with 780 Å, the jitter was 29 ns, the WCN was 28 dB. At this time, Hg/Hp was 0.33, and Lbg/Lbp was 0.78.

COMPARATIVE EXAMPLE 3

The master was exposed on the same condition as the above-described example 6 except that Tw was set to 80 ns. When the ROM area of the optical information recording medium was reproduced by a record-reproducing unit having a pickup with 780 Å, the jitter was 38 ns, WCN was 33.5 dB. Thus, WCN met the standard of the Orange Book, but the jitter did not meet the standard of 35 ns. At this time, Hg/Hp was 0.04, and Lbg/Lbp was 0.95.

COMPARATIVE EXAMPLE 4

The master was exposed on the same condition as the above-described example 6 except that Tw was set to 200 ns. When the ROM area of the optical information recording medium was reproduced by a record-reproducing unit having a pickup with 780 Å, the jitter was 28 ns, WCN was 25.5 dB. At this time, Hg/Hp was 0.58, and Lbg/Lbp was 0.66.

TABLE 1

| | Jitter (nsec) | Push-pull | WCN (dB) | Wobble of pit (nm) | Wobble of pit between pits (nm) | Corresponding Figure |
|---|---|---|---|---|---|---|
| Ex. 1 | 31 | 0.150 | 37 | 70 | 70 | FIG. 1 |
| Ex. 2 | 30 | 0.146 | 35 | 70 | 70 | FIG. 1 |
| Ex. 3 | 31 | 0.146 | 37 | 70 | 110 | FIG. 1 |
| Ex. 4 | 30 | 0.142 | 34 | 70 | 70 | FIG. 2 |
| Ex. 5 | 30 | 0.142 | 36 | 70 | 110 | FIG. 2 |
| Comp. EX. 1 | 27 | 0.094 | 30 | 70 | — | FIG. 3 |
| Comp. EX. 2 | 40 | 0.155 | 38 | 70 | 70 | FIG. 4 |

This document claims priority and contains subject matter related to Japanese Patent Application No. 2000-348702 filed on Nov. 15, 2000 incorporated herein by reference.

Having now fully described the invention, it will be apparent to one of ordinary skill in the art that many changes and modifications can be made thereto without departing from the spirit and scope of the invention as set forth therein.

What is claimed is:

1. An optical information recording medium comprising a ROM area in which pre-pits are arranged in a line in advance, wherein a groove having a depth smaller than a depth of the pre-pits is formed between the pre-pits, and wherein the groove has a width at junction parts of the groove and the pre-pits smaller than a width of a part of the groove other than the junction part.

2. The optical information recording medium according to claim 1, wherein the following relationships are satisfied:

½ Wg≦Wpg<Wg; and Wpg<Wp where Wp, Wpg ad Wg represent a width of the pre-pit, the width of the groove at the junction parts, and the width of the other pan of the groove other than the junction parts, respectively.

3. An optical information recording medium comprising a ROM area in which pre-pits are arranged in a line in advance, wherein a groove having a depth smaller than a depth of the pre-pits is formed between the pre-pits, and wherein the groove has a depth at junction parts of the groove and the pre-pits smaller than a depth of a part of the groove other than the junction parts.

4. The optical information recording medium according to claim 3, wherein the following relationship is satisfied:

½ Dg≦Dpg<Dg where Dpg represents the depth of the groove at the junction parts, and Dg represents the depth of the other part of the groove.

5. An optical information recording medium comprising a substrate, a ROM area which is formed on the substrate and in which pre-pits are arranged in a line in advance and a recordable area which is farmed on the substrate and in which a guiding groove is arranged, the pre-pits and the guiding groove wobbling in a radius direction of a substrate, wherein a groove having a depth smaller than a depth of the pre-pits is formed between the pre-pits, and the groove between said pre-pits has a wobbling amount greater than a wobbling amount of the pre-pits.

6. An optical information recording medium comprising a ROM area in which pre-pits are arranged in a line in advance and a recordable area in which a guiding groove is arranged, wherein a pit having a depth not greater than a depth or the pre-pits is formed between the pre-pits, wherein the pit is connected to two of the pre-pits.

7. An optical information recording medium comprising a substrate, a ROM area which is formed on the substrate and in which pre-pits are arranged in a line in advance and a recordable area which is formed on the substrate and in which a guiding groove is arranged, the pre-pits and the guiding groove wobbling in the radial direction of the substrate, wherein a pit having a depth smaller than a depth of the pre-pits is formed between the pre-pits, and the pit has a wobbling amount greater than a wobbling amount of pre-pits.

8. An optical information recording medium comprising a substrate, a ROM area which is formed on the substrate and in which pre-pits are arranged in a line in advance and a recordable RAM area which is formed on the substrate and in which a pre-groove is arranged, a recording layer located overlying the substrate, a reflection layer located overlying the recording layer, and a protection layer located overlying the reflection layer, wherein a groove is formed between the pre-pits along the line of the pre-pits, and a projection portion is formed in a height direction of the substrate at junction parts of the pre-pits and the groove.

9. The optical information recording medium according to claim 8, wherein the recording layer is a dye layer.

10. The optical information recording medium according to claim 8, wherein the following relationship is satisfied;

$Hg/Hp > 0.08$ wherein Hp represents a height from a bottom of the pre-pits to a top of the projection part, and Hg represents a height from a bottom of the groove to the top of the projection part.

11. The optical information recording medium according to claim 10, wherein the following relationship is satisfied:

$Lbg/Lbp > 0.75$ wherein Lbp represents a track-direction length of the bottom of the pre-pits of a 3T pit, and Lbg represents a track-direction length of the bottom f the groove between the pro-pits of a 3T land.

12. The optical information recording medium according to claim 8, wherein said projection part has a steep-edged shape.

13. An optical information recording medium comprising a ROM area in which pre-pits are arranged in a line in advance and a recordable area in which a guiding groove is arranged, wherein a pit having a depth nor greater than a depth of the pre-pits is formed between the pre-pits, and wherein a shallow groove is present between deep pre-pits.

14. The optical information recording medium according to claim 13, wherein the pit is connected to two of the pre-pits.

15. The optical information recording medium according to claim 13, wherein the depth of the pit is equal to the depth of the guiding groove.

16. The optical information recording medium according to claim 13, wherein the pit has a width not greater than a width of the guiding groove.

* * * * *